US007986247B2

(12) United States Patent
Bauer et al.

(10) Patent No.: US 7,986,247 B2
(45) Date of Patent: Jul. 26, 2011

(54) ADVISORY SYSTEM FOR PREVIEWING LOCAL CONDITIONS ON A HIGHWAY

(75) Inventors: James Anthony Bauer, Ypsilanti, MI (US); Masato Okuda, Novi, MI (US)

(73) Assignee: Toyota Motor Engineering & Manufacturing North America, Inc., Erlanger, KY (US)

( * ) Notice: Subject to any disclaimer, the term of this patent is extended or adjusted under 35 U.S.C. 154(b) by 810 days.

(21) Appl. No.: 11/837,530

(22) Filed: Aug. 12, 2007

(65) Prior Publication Data

US 2008/0042876 A1 Feb. 21, 2008

Related U.S. Application Data

(63) Continuation-in-part of application No. 11/548,419, filed on Oct. 11, 2006, now Pat. No. 7,427,929.

(60) Provisional application No. 60/725,967, filed on Oct. 12, 2005.

(51) Int. Cl.
*B60Q 1/00* (2006.01)
*G08G 1/00* (2006.01)
*G06G 7/78* (2006.01)

(52) U.S. Cl. ........ 340/905; 340/435; 340/436; 340/901; 340/902; 340/904; 701/300; 701/301; 701/302

(58) Field of Classification Search .......... 340/435–436, 340/463–479, 901–905; 701/300–302
See application file for complete search history.

(56) References Cited

U.S. PATENT DOCUMENTS

| | | | | |
|---|---|---|---|---|
| 3,683,328 | A | 8/1972 | Richard | |
| 4,706,086 | A | 11/1987 | Panizza et al. | |
| 5,546,311 | A | 8/1996 | Sekine et al. | |
| 6,236,337 | B1 | 5/2001 | Beier et al. | |
| 6,249,232 | B1 | 6/2001 | Tamura et al. | |
| 6,445,308 | B1 | 9/2002 | Koike et al. | |
| 6,765,495 | B1 * | 7/2004 | Dunning et al. | 340/903 |
| 6,870,487 | B2 | 3/2005 | Nuesser et al. | |
| 6,985,089 | B2 * | 1/2006 | Liu et al. | 340/903 |
| 7,330,103 | B2 * | 2/2008 | Boss et al. | 340/435 |
| 7,378,986 | B2 * | 5/2008 | Eckstein et al. | 340/902 |
| 7,548,173 | B2 * | 6/2009 | Tengler et al. | 340/903 |
| 2003/0006889 | A1 | 1/2003 | Koike | |
| 2003/0102997 | A1 | 6/2003 | Levin et al. | |
| 2004/0178926 | A1 | 9/2004 | Lee et al. | |
| 2005/0088318 | A1 | 4/2005 | Liu et al. | |
| 2005/0131629 | A1 | 6/2005 | Ignatin | |
| 2005/0225457 | A1 | 10/2005 | Kagawa | |
| 2006/0049963 | A1 | 3/2006 | Smith | |

FOREIGN PATENT DOCUMENTS

| | | |
|---|---|---|
| JP | 63168813 | 7/1988 |
| JP | 63192900 | 8/1988 |
| JP | 11083998 | 3/1999 |
| JP | 20033223696 | 8/2003 |
| JP | 2004013413 | 1/2004 |
| JP | 2004164315 | 6/2004 |

* cited by examiner

*Primary Examiner* — Benjamin C Lee
*Assistant Examiner* — Lam P Pham
(74) *Attorney, Agent, or Firm* — Gifford, Krass, Sprinkle, Anderson & Citkowski, P.C.

(57) ABSTRACT

A driver advisory system for previewing the local traffic conditions on a highway is described. Apparatus according to an embodiment of the present invention includes an advisory system that transmits information regarding the status of the host vehicle to drivers of other vehicles, in particular when the status of the host vehicle presents a hazardous condition to other vehicles. The advisory system may also receive information from other vehicles, and provide an alert to the driver of the host vehicle if a hazardous condition exists.

21 Claims, 3 Drawing Sheets

ADVISORY SYSTEM FOR PREVIEWING LOCAL CONDITIONS ON A HIGHWAY

REFERENCE TO RELATED APPLICATIONS

This application claims priority from and is a continuation-in-part of U.S. patent application Ser. No. 11/548,419, filed Oct. 11, 2006, which claims priority from U.S. Provisional Application Ser. No. 60/725,967 filed Oct. 12, 2005, both of which are incorporated herein by reference in their entirety.

FIELD OF THE INVENTION

The invention relates to a driver advisory system for use in a host vehicle on a highway.

BACKGROUND OF THE INVENTION

Highway driving has unique characteristics compared to other road types. Shifting to PARK mode is a typical event near an arterial road, side street or parking lot, but on a highway it is an important data element that can be shared for the benefit of the driving public. The same is true with parameters such as lower vehicle speeds, a passenger opening a door, or a driver getting out of their seat to leave a vehicle.

Information concerning the status of a vehicle on a highway is currently provided by variable advisory message signs and wide-area radio frequency broadcasts, but these methods provide incomplete information that can be inconvenient to access. Advisory message signs are typically constructed along only urban highways, are usually situated at distant intervals, and are often difficult to read. Wide-area broadcasts that address the status of a vehicle on a highway have issues involving infrastructure coverage and timeliness of their reporting because the broadcasts are supported by detection methods that are limited in nature. Data collection and dissemination regarding the status of a vehicle on a highway currently focuses on the after effect that a vehicle has on surrounding traffic patterns. The entry and exit of occupants and the operational status of the vehicle are aspects that are not satisfactorily addressed by current systems.

In Japanese Patent laid-open Application No. 2004-78562, a communication system is disclosed for transmitting information regarding the driver's status to a remote vehicle. This patent application, however, does not disclose a system for providing an advisory message to other vehicles regarding the location of the occupants of a vehicle on a highway. Further, it does not disclose a system for providing information regarding the relative operational characteristics of a car in the same said location, and does not provide an advisory message that focuses on vehicle operations that are outside the scope of typical highway driving.

SUMMARY OF THE INVENTION

The present invention discloses short-range communications of less than 1000 meters to provide highway drivers with a preview of their local environment. A driver advisory system is provided for use in a host vehicle. The advisory system includes a sensor, a processor, and a communication unit. The sensor monitors the conditions of the host vehicle relevant to highway travel. The sensor provides an output quantifying the highway travel status of the host vehicle. The processor receives the output provided by the sensor and can calculate a risk factor as a function of the output provided by the sensor. The processor can also provide an output signal having information concerning the status of the host vehicle and its occupants in response to the risk factor exceeding a predetermined threshold value. The communication unit receives the output signal from the processor and transmits the information for retrieval by other vehicles in the vicinity of the host vehicle. The communication unit can also receive similar information from other vehicles and sends it to a second processor. The second processor then determines if a hazardous situation in the vicinity should be reported to the driver.

DETAILED DESCRIPTION OF THE INVENTION

This invention relates to a driver advisory system for use in a host vehicle and for providing an alert to the drivers of other vehicles traveling on a highway in the vicinity of the host vehicle. More specifically, the system relates to a driver advisory system that provides an alert to the drivers of other vehicles regarding the status of the host vehicle when the host vehicle is performing non-standard operations on a highway. The advisory system detects highway-related conditions of the host vehicle and its drivers and passengers. The advisory system then broadcasts or transmits a message about these conditions to vehicles in the vicinity of the host vehicle. The advisory system also provides a vehicle description, the heading of the host vehicle, and its position information.

Figure 1:
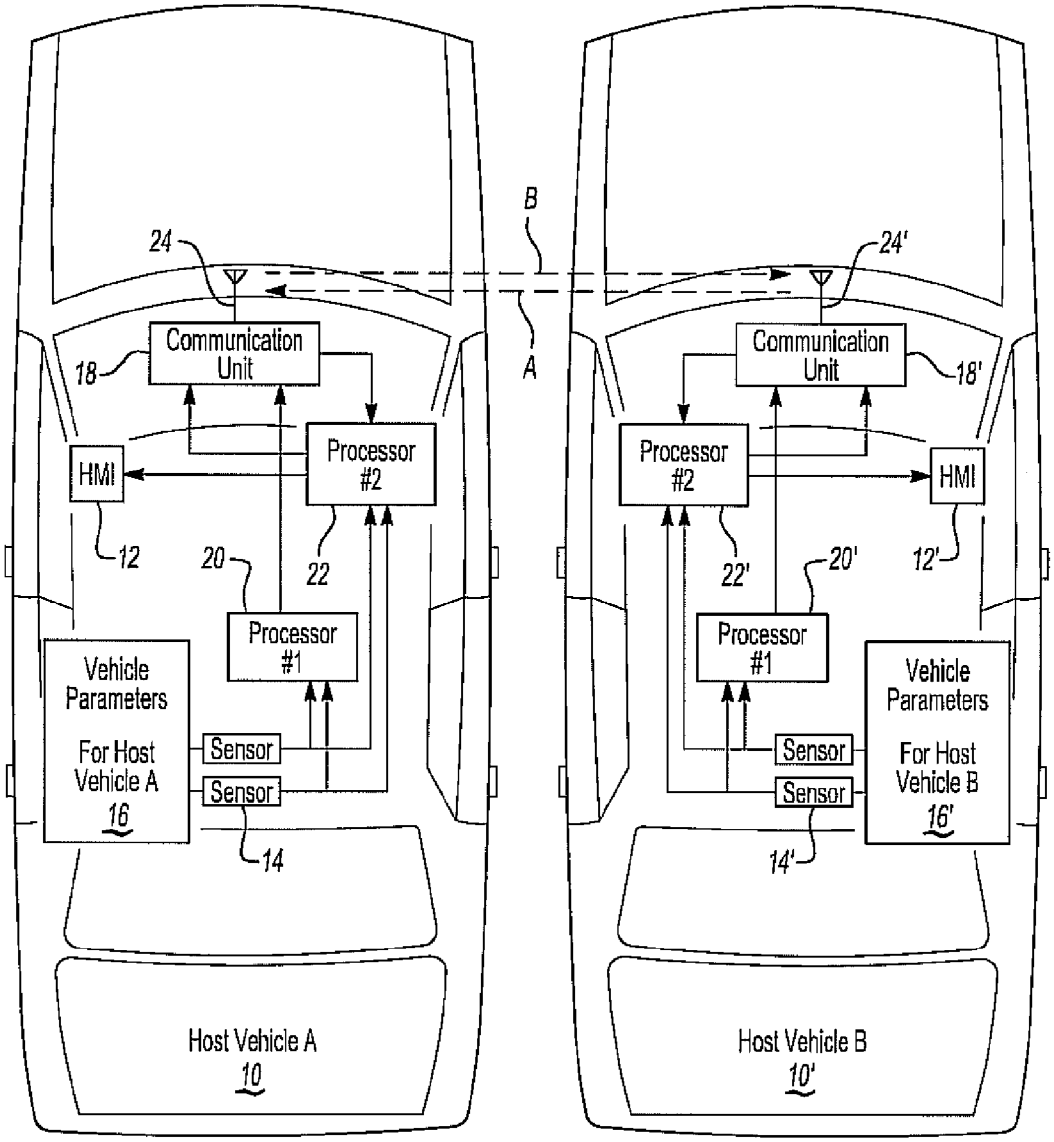
FIG. 1 is a schematic of an advisory system according to an embodiment of the invention.

The advisory system is generally indicated in FIG. 1. The advisory system 10 is associated with a host vehicle (host vehicle A), and includes at least one sensor 14 for sensing a vehicle parameter 16 of the host vehicle A. In this example, a plurality of sensors 14 are used for sensing vehicle parameters 16 relevant to highway travel illustratively including vehicle speed and stability thresholds, directional heading (compass), yaw rate, transmit power, RSSI (Received Signal Strength Indication), airbag deployment status, transmission mode (PRNDL), emergency brake applied, hazard light and head/tail/parking lights status, seat occupancy, door open/close status, vision data, radar data, vehicle make/model/color, vehicle location, and highway identification. Sensors 14 may be any type of suitable sensor known by those of ordinary skill in the art, such as switch-based sensors, force/weight sensors, inductive sensors, vision sensors, radar sensors, capacitive sensors, and sensors that detect digital memory. Each sensor 14 provides a sensor output related to a vehicle parameter 16.

A first processor 20 receives the sensor outputs provided by the sensors 14. The first processor 20 calculates a risk factor as a function of the sensor outputs, and provides an output signal in response to the risk factor exceeding a predetermined threshold value. The output signal includes information concerning the highway status of the host vehicle.

A communication unit 18 receives the output signal from the first processor 20. The communication unit 18 transmits an advisory message (shown as arrow B) for retrieval by other vehicles in the vicinity of the host vehicle. In this example, the communication unit 18 is a dedicated short-range communication device having a receiver and transmitter. An antenna 24 can be mounted on the vehicle. The communication unit 18 can, for example, communicate via a radio frequency, low or high band frequencies, Zigbee, or 802.11-based protocol. The advisory message can either be broadcast a single time, for example if the host vehicle A is traveling at a low speed, or at intervals when a vehicle parameter 16 indicates a hazardous status, such as when the host vehicle A is in PARK or a door is open.

The advisory system 10 may also receive advisory messages (shown as arrow A) transmitted from a second vehicle (host vehicle B) in the vicinity of host vehicle A. Specifically, the communication unit 18 can receive messages transmitted from vehicle B regarding the status of host vehicle B, its occupants, the highway position and heading.

Upon receiving messages transmitted from vehicle B, the communication unit 18 can provide a signal to a second processor 22. With the outputs from vehicle sensors 14 and the signal from communication unit 18, the second processor 22 continuously calculates the distance and position of the host vehicle A relative to the vehicle B. This function, and others, may alternatively be performed by a single processor.

The distance and position of vehicle A relative to vehicle B can be determined using historical data, and may include vehicle speed, compass heading, yaw rate, transmit power, RSSI, the time/location of vehicles passing on the same side and on the opposite side of the highway, and the temporary ID of the vehicle. This historical data can also be periodically sent out from all vehicles. To optimize channel usage and to avoid unnecessary processing, a host vehicle may select appropriate data for transmission.

The second processor 22 of host vehicle A can provide an alert signal regarding the highway status of vehicle B and its occupants. A human machine interface (HMI) 12 receives the alert signal and provides information to a driver and/or passenger of host vehicle A regarding the distance and position of vehicle B relative to the vehicle A. The HMI 12 also provides an advisory message to the driver regarding the highway status of vehicle B and its occupants.

The second processor 22 can also initiate a rebroadcast of the information received from vehicle B, for example in cases when vehicle A is traveling on the opposite side of the highway relative to vehicle B. The number of rebroadcasts may be limited to a number and interval that is sufficient for informing vehicles that are approaching vehicle B, without flooding the channel with repetitive advisory messages from many vehicles. The second processor 22 can be operable to identify if other vehicles have already rebroadcast the advisory message from vehicle B via information provided within the contents of the advisory message. If there is no evidence of having received a rebroadcast of the advisory message from the vehicle B, the second processor initiates a rebroadcast once an appropriate distance is established between vehicles A and B, and when the original advisory message from vehicle B is no longer detected by vehicle A.

It can be determined if the host vehicle is approaching a vehicle that is transmitting information by monitoring the Received Signal Strength Indication (RSSI). A vehicle passing the host vehicle can also be detected in this manner.

Figure 2:
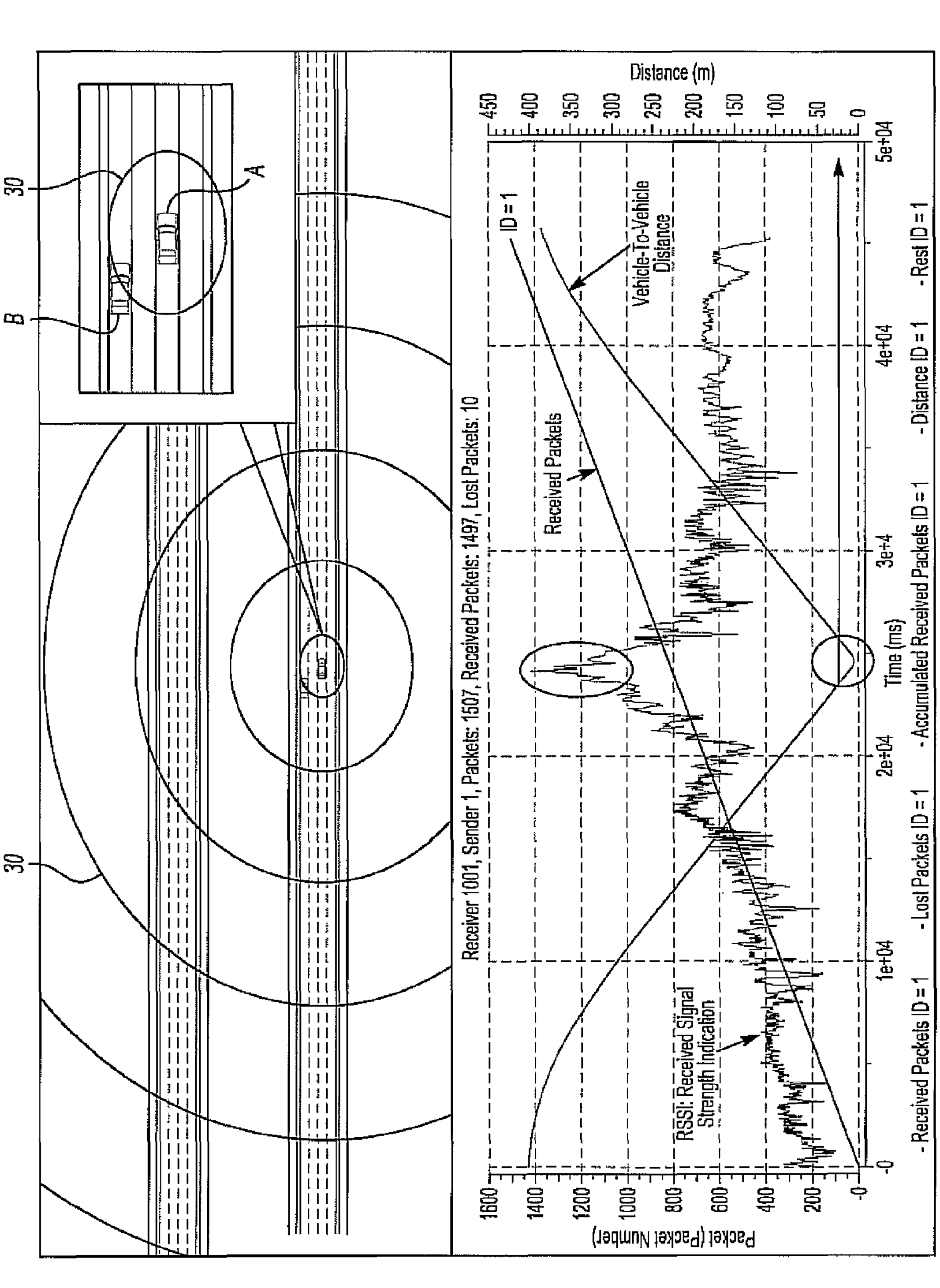
FIG. 2 is a schematic that shows how transmit power and Received Signal Strength Indication (RSSI) can be used to determine vehicle proximity.

FIG. 2 illustrates a technique that permits vehicles to determine the proximity of other transmitting vehicles through the RSSI. Such proximity information allows the receiving vehicle to determine whether or not they are on the same highway as the sending vehicle.

Once the driver advisory system 10 determines that the host vehicle A is on a highway through a navigation system or another method, the communication unit 18 in vehicle A begins transmitting a periodic signal 30. This proximity signal 30 is based on a typical or known width of the highway and also includes information concerning the power that the signal is being transmitted. A driver advisory system 10' in a vehicle B traveling in the vicinity of the host vehicle A can determine if it has received a signal with a received signal strength indication (RSSI) that applies to the typical width of the highway the vehicle B is traveling. By first measuring the received signal strength, then comparing it to the power at which the signal is transmitted and factoring in the typical width of the highway, the driver advisory system 10' of vehicle B can determine the proximity of vehicle A and the likelihood of being on the same highway.

For example, the graph in FIG. 2 represents an event where vehicle B approaches and passes vehicle A which is standing stationary on the same side of a highway. Vehicles A and B in FIG. 2 are test vehicles equipped with GPS devices which allow the distance between the vehicles to be calculated as indicated by the Vehicle-to-Vehicle Distance plot. The Vehicle-to-Vehicle Distance plot corresponds directly with the RSSI plot also shown on the graph. The fact that test vehicle A is stationary allows the typical RSSI pattern to be plotted about 400 meters before and 400 meters after the stationary position of vehicle A. As vehicle B approaches vehicle A, the periodic signal 30 transmitted by the driver advisory system 10 in vehicle A is received by the driver advisory system 10' of vehicle B.

As explained above, the second microprocessor 22' of system 10' determines whether or not vehicles A and B come in close proximity of each other, as indicated by the smallest circled area in the upper portion of FIG. 2. This smallest circled area corresponds directly with the circled peak of the RSSI plot in the lower portion of the figure. If processor 22' detects RSSI values that reach the circled peak level, system 10' can determine that vehicle B is traveling on the same highway as vehicle A.

As for the Received Packet Plot in FIG. 2, a "packet" refers to a collection of data elements that can include data on the time of transmission, packet ID, vehicle position in latitude/longitude coordinates, vehicle speed and stability thresholds, yaw rate, transmit power, airbag deployment status, transmission mode (PRNDL), emergency brake applied, hazard light and head/tail/parking lights status, seat occupancy, door open/close status, vision data, radar data, vehicle make/model/color and combinations thereof. In addition, the second processor 22' can determine whether or not an advisory should be submitted to the HMI 12' for communication to an occupant of vehicle B.

Hence, by transmitting data that includes the power at which the data is being transmitted, other receiving vehicles can monitor the signal strength received so as to calculate the proximity of the transmitting vehicle and determine if they are on the same highway. This signal can also be used on arterial roads for similar locating purposes.

The detection of a host vehicle A entrance onto a highway can also be aided by monitoring the history of speed, compass heading and/or yaw rate of the host vehicle. Another method of determining that a vehicle A sending information is on a highway includes estimating the highway path using data collected from other vehicles.

Figure 3:
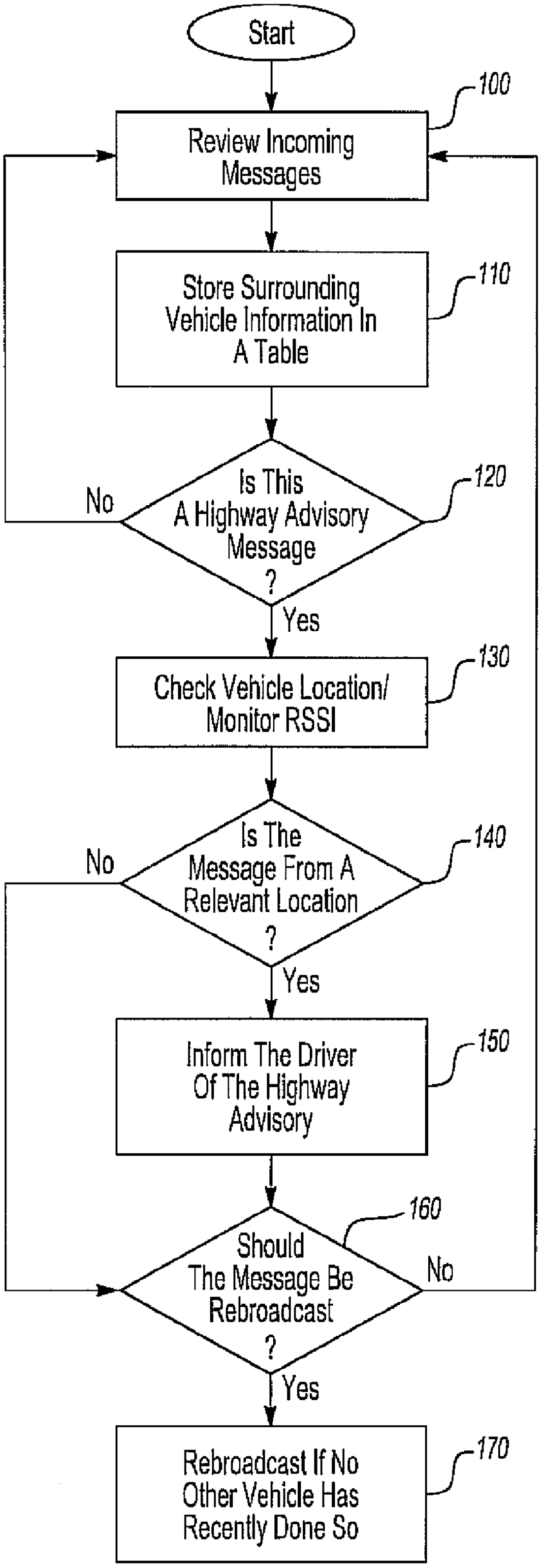
FIG. 3 is a flowchart describing a mode of operation of an advisory system according to an embodiment of the invention.

FIG. 3 shows a flowchart for a mode of operation of system 10 in FIG. 1. In this example, at step 100 the advisory system within a host vehicle continuously monitors all incoming messages from other systems in the vicinity of the vehicle. Information relating to at least a second vehicle in the vicinity of the host vehicle is stored in a table at step 110. The system determines if any of the incoming messages are advisory messages provided by a second vehicle at step 120, and if the advisory message is not a highway local preview message, the system continues to review incoming messages. If the message is a highway local preview message, then the system checks the current location of the vehicles and monitors the RSSI of the second vehicle at step 130. If the host vehicle is approaching the second vehicle on the same highway and in the same direction of travel, then the system provides an advisory alert to the driver of the host vehicle relating to the location and status of the second vehicle (step 150). The system checks the advisory message contents to determine if the advisory message is appropriate for rebroadcast at step 160. If the advisory message is appropriate for rebroadcast, the system waits until a threshold range is reached and the applicable advisory message is no longer being received, then the system rebroadcasts the advisory message at step 170.

The invention has been described in an illustrative manner. It is, therefore, to be understood that the terminology used is intended to be in the nature of words of description rather than of limitation. Many modifications and variations of the invention are possible in light of the above definition. Thus within the scope of the appended claims, the invention may be practiced other than as specifically described.

The invention is not restricted to the illustrative examples described above Examples are not intended as limitations on the scope of the invention. Methods, apparatus, electrical circuits, compositions, and the like described herein are exemplary and not intended as limitations on the scope of the invention. Changes therein and other uses will occur to those skilled in the art. The scope of the invention is defined by the scope of the claims.

Having described our invention, we claim:

1. A driver advisory system in a first host vehicle on a highway transmitting information regarding the status of said first host vehicle and its occupants to a second host vehicle on a highway, said driver advisory system comprising:

a sensor monitoring a vehicle parameter of said first host vehicle;

a first processor operable to receive a sensor output from said sensor, calculate a risk factor for collision with other approaching vehicles and provide an output signal related to the risk factor;

a communication unit operable to receive said output signal from said first processor and transmit an outgoing advisory message relating to the risk factor, said communication unit also operable to receive an incoming advisory message relating to calculated risk factor based on a vehicle parameter sensor output from said second host vehicle and provide said incoming message to a second processor; and said second processor operable to receive said incoming advisory message from said communication unit, determine if the first host vehicle is approaching the second host vehicle on the same highway and in the same direction of travel, and determine if said advisory message should be provided to the driver of said first host vehicle based on said determination.

2. A driver advisory system as set forth in claim 1, further comprising a human-machine interface operable to receive said advisory from said second processor and provide said advisory to the driver of said first host vehicle.

3. A driver advisory system as set forth in claim 1, further comprising a plurality of sensors monitoring a plurality of vehicle parameters of said first host vehicle.

4. A driver advisory system as set forth in claim 1, wherein said vehicle parameter is selected from a group of vehicle parameters consisting of: vehicle speed and stability thresholds, acceleration, yaw rate, transmit power, RSSI, airbag deployment status, transmission mode selection, emergency brake status, hazard light status, head/tail/parking lights status, seat occupancy, door open/close status, forward looking vision and radar data, vehicle make/model/color, vehicle location and highway identification.

5. A driver advisory system as set forth in claim 1 wherein said sensor is selected from the group consisting of switch-based sensors, force/weight sensors, inductive sensors, vision-based sensors, radar sensors, capacitive sensors, and sensors that detect digital data stored on microprocessor memory.

6. A driver advisory system as set forth in claim 1, wherein said outgoing advisory message has information related to said first host vehicle selected from the group of information consisting of vehicle speed and stability thresholds, acceleration, yaw rate, transmit power, RSSI, airbag deployment status, transmission mode selection, emergency brake status, hazard light status, head/tail/parking lights status, seat occupancy, door open/close status, forward looking vision and radar data, vehicle make/model/color, vehicle location, highway identification and combinations thereof.

7. A driver advisory system as set forth in claim 1, wherein said second processor is operable to receive said incoming advisory message from said communication unit and calculate a position and differential location change of said first host vehicle relative to said second host vehicle.

8. A driver advisory system as set forth in claim 7, wherein said second processor is operable to provide an advisory to said human-machine interface based on said position and differential location change of said first host vehicle relative to said second host vehicle.

9. A driver advisory system as set forth in claim 1, wherein said outgoing advisory message is a periodic message including the typical or known width of the highway and information related to a power at which said outgoing advisory message is transmitted.

10. A driver advisory system as set forth in claim 1, wherein said incoming message to said second processor is a periodic message including information related to a power at which said incoming was transmitted, an RSSI of said incoming signal and a heading of said second host vehicle.

11. A driver advisory system as set forth in claim 10, wherein said second processor is operable to analyze the transmit power, RSSI and vehicle heading information within said incoming message and determine if said first host vehicle and said second host vehicle are on the same highway and traveling in the same direction.

12. A driver advisory system in a first host vehicle on a highway transmitting information regarding the status of said first host vehicle and its occupants to a second host vehicle on a highway, said driver advisory system comprising:

a sensor monitoring a vehicle parameter of said first host vehicle;

a first processor operable to receive a sensor output from said sensor, calculate a risk factor for collision with other approaching vehicles and provide an output signal related to the risk factor;

a communication unit operable to receive said output signal from said first processor, transmit an outgoing advisory message related to a width of said highway and said output signal, said communication unit also operable to receive an incoming advisory message from said second host vehicle and provide said incoming message to a second processor; and a human-machine interface;

said second processor operable to:

receive said incoming advisory message from said communication unit and calculate a position and differential location change of said first host vehicle relative to said second host vehicle; and provide an advisory to said human-machine interface based on said position and differential location change of said first host vehicle relative to said second host vehicle, for the purpose of a first host vehicle on a highway transmitting information regarding the status of said first host vehicle and its occupants to a second host vehicle on a highway.

13. A method of providing information related to a first host vehicle on a highway to a second host vehicle on a highway regarding the status of the first host vehicle and its occupants, the method comprising the steps of:

providing a sensor, the sensor sensing a condition of the first host vehicle and its occupants and providing a sensor output;

providing a first microprocessor, the microprocessor receiving the sensor output from the sensor, quantifying the condition of the host vehicle and its occupants in the form of an output, calculating a risk factor for collision with other approaching vehicles related to the output and providing an output signal related to the risk factor;

providing a communication unit, the communication unit receiving the output signal from the first microprocessor, transmitting an outgoing advisory message to and receiving an incoming advisory message relating to calculated risk factor based on a vehicle condition sensor output from the second host vehicle; and providing a second microprocessor, the second microprocessor receiving the incoming advisory message from the communication unit and providing an advisory to the driver if the first host vehicle is approaching the second host vehicle on the same highway and in the same direction of travel.

14. A method as set forth in claim 13, including the step of providing a plurality of sensors monitoring a plurality of the conditions of the host vehicle and its occupants, including vehicle speed/stability thresholds, directional heading (compass), yaw rate, transmit power, RSSI, airbag deployed, transmission shift mode, emergency brake applied, hazard lights and head/tail/parking light status, occupant sensing, door open/close status, vision and radar data, vehicle make/model/color, vehicle location and highway identification.

15. A method as set forth in claim 13 including the step of the communication unit transmitting information concerning a location and status of the first host vehicle and its occupants for retrieval by other vehicles in the vicinity of the first host vehicle, in response to the risk factor exceeding a predetermined threshold value.

16. A method as set forth in claim 13 including the step of the communication unit receiving messages transmitted from the second host vehicle regarding the condition of the second host vehicle and its occupants.

17. A method as set forth in claim 13 including a step of the second microprocessor determining if the first host vehicle is approaching or moving away from the second host vehicle.

18. A method as set forth in claim 13 including the step of the second microprocessor providing to a driver of the first host vehicle an advisory signal in response to the first host vehicle's movement toward the second host vehicle.

19. A method as set forth in claim 13 including the step of the second microprocessor determining if information regarding the status of the second host vehicle has been retransmitted by another vehicle in the vicinity of the first vehicle, the second microprocessor retransmitting the information regarding the status of the second host vehicle and its occupants to the communication unit for transmitting to other vehicles in the vicinity of the first vehicle when the status of the second host vehicle has not been retransmitted by another vehicle.

20. A method as set forth in claim 13 including the step of the second microprocessor detecting when a transmitting vehicle passes by the first host vehicle by monitoring the RSSI peak of the transmitting vehicle.

21. A method as set forth in claim 13 including the step of the second microprocessor determining if the second host vehicle is on a highway by monitoring the history of speed, compass heading and yaw rate of the second host vehicle and comparing the monitored history of speed, compass heading and yaw rate of the second host vehicle with an estimated highway path of the second host vehicle determined from data transmitted to the first host vehicle by other transmitting vehicles.

* * * * *